(12) United States Patent
Signorelli et al.

(10) Patent No.: US 7,723,991 B2
(45) Date of Patent: May 25, 2010

(54) APPARATUS AND METHOD FOR AZIMUTHAL MWD RESISTIVITY IMAGING AT MULTIPLE DEPTHS OF INVESTIGATION

(75) Inventors: Jack Signorelli, Cypress, TX (US); Tsili Wang, Katy, TX (US); Roland E. Chemali, Humble, TX (US)

(73) Assignee: Baker Hughes Incorporated, Houston, TX (US)

( * ) Notice: Subject to any disclaimer, the term of this patent is extended or adjusted under 35 U.S.C. 154(b) by 0 days.

(21) Appl. No.: 11/865,844

(22) Filed: Oct. 2, 2007

(65) Prior Publication Data
US 2009/0085570 A1    Apr. 2, 2009

(51) Int. Cl.
*G01V 3/08* (2006.01)
(52) U.S. Cl. .................. 324/338; 324/339
(58) Field of Classification Search .......... 324/366, 324/369–371, 323–343
See application file for complete search history.

(56) References Cited

U.S. PATENT DOCUMENTS

| 5,811,973 | A | 9/1998 | Meyer, Jr. ............... 324/338 |
| 5,869,968 | A | 2/1999 | Brooks et al. ........... 324/338 |
| 5,892,361 | A | 4/1999 | Meyer, Jr. et al. ...... 324/338 |
| 6,211,678 | B1 * | 4/2001 | Hagiwara ............... 324/338 |
| 6,359,438 | B1 * | 3/2002 | Bittar .................... 324/369 |
| 6,957,708 | B2 | 10/2005 | Chemali et al. ........... 175/50 |
| 7,109,719 | B2 | 9/2006 | Fabris et al. ............ 324/367 |

* cited by examiner

*Primary Examiner*—Reena Aurora
(74) *Attorney, Agent, or Firm*—Mossman Kumar & Tyler PC

(57) ABSTRACT

A combination of a shallow-reading and a deep-reading, azimuthally sensitive, multiple propagation devices is used for providing depth images the earth formation with different depth of investigation. It is emphasized that this abstract is provided to comply with the rules requiring an abstract which will allow a searcher or other reader to quickly ascertain the subject matter of the technical disclosure. It is submitted with the understanding that it will not be used to interpret or limit the scope or meaning of the claims.

21 Claims, 4 Drawing Sheets

APPARATUS AND METHOD FOR AZIMUTHAL MWD RESISTIVITY IMAGING AT MULTIPLE DEPTHS OF INVESTIGATION

BACKGROUND OF THE DISCLOSURE

1. Field of the Disclosure

The present disclosure relates to obtaining measurements of properties of a formation surrounding a wellbore using a propagation resistivity tool conveyed on a measurement-while-drilling device. In particular, the present disclosure discusses obtaining azimuthal measurements at different depths of investigation using a propagation resistivity tool.

2. Description of the Related Art

This disclosure relates to the measurement of geophysical parameters of earth formations penetrated by a borehole and more particularly to propagation resistivity measurements at multiple transmitter frequencies and multiple transmitter receiver spacing. Measurements are typically made using an array of four transmitters and two receivers. Elements of the transmitter receiver array are longitudinally and symmetrically spaced along an elongated borehole instrument. Each transmitter induces an alternating voltage into the borehole and the earth formation in the vicinity of the borehole. The amplitudes and phase shifts of the signals produced by these induced alternating electromagnetic fields are measured by the receivers. These signals are affected by numerous formation, near borehole and borehole parameters. The measurements are combined to yield resistivity of the formation, parameters relating to the invasion of drilling fluids into the formation in the near borehole region, and physical characteristics of the borehole itself. The disclosure is directed toward, but not limited to, measurement while drilling (MWD) applications.

A complete description of an exemplary multiple propagation resistivity (MPR) tool is given, for example, in U.S. Pat. No. 5,869,968 to Brooks et al., having the same assignee as the present disclosure and the contents of which are incorporated herein by reference. U.S. Pat. No. 5,892,361 to Meyer Jr. et al, having the same assignee as the present disclosure and the contents of which are incorporated herein by reference, discloses a propagation resistivity measurement-while-drilling device used to measure borehole environmental parameters along with electromagnetic properties of the formation. Multiple transmitter-receiver pairs operating at one or more transmitter frequencies are used to obtain a set of amplitude and phase measurements. A model of the response of the borehole instrument in varying formation and borehole conditions is also utilized. Formation and borehole parameters of interest are selected by the analyst. The measured amplitude and phase data set is then combined with the model of the tool response to obtain the selected parameters of interest.

In one method of operation disclosed in Brooks, each transmitter is sequentially activated while the other transmitter is decoupled to eliminate mutual coupling, and the recorded signals processed to take advantage of reciprocity relations. In another method of operation, both transmitters are operated simultaneously with one relative polarity and then with another relative polarity, to eliminate the effects of mutual coupling and to take advantage of reciprocity relations. The process of compensation and use of the reciprocity relations reduces the redundancy that is inherent in the data.

A drawback of the prior art methods is the lack of azimuthal resolution of the acquired data. Azimuthal imaging of the earth formation and determination of distances to formation interfaces is an important part of drilling. U.S. patent application Ser. No. 11/489,875 of Wang et al., having the same assignee as the present disclosure and the contents of which are incorporated herein by reference, discloses producing a pseudo-image by combining deep-reading azimuthally sensitive resistivity measurements with azimuthally insensitive resistivity measurements made by a multiple propagation resistivity tool. This image is useful in reservoir navigation. The azimuthally sensitive measurements are obtained by using a device with an axially oriented transmitter and transverse receiver. As would be known to those versed in the art, precise orientation of the transverse antenna is required. U.S. Pat. No. 6,957,708 to Chemali discloses an arrangement in which transmitters and receivers are mounted on stabilizers. Such an arrangement may be limiting in terms of the power that can be transmitted into the formation as well as in terms of the depth of investigation. The present disclosure deals with a multiple propagation resistivity (MPR) device for resistivity imaging that does not have a transverse antenna.

SUMMARY OF THE DISCLOSURE

One embodiment of the disclosure is an apparatus for evaluating an earth formation. The apparatus includes a logging tool configured to be conveyed into a borehole. A first sensor arrangement on the logging tool is configured to produce first measurements indicative of a resistivity property of the earth formation at a first plurality of rotational positions of the logging tool. A second sensor arrangement on the logging tool includes two axially oriented receiver antennas on a side of the logging tool and two axially oriented transmitter antennas symmetrically disposed about the two axially oriented receiver antennas. The second sensor arrangement is configured to produce second measurements indicative of the resistivity of the earth formation having a depth of investigation greater than that of the first measurements at a second plurality of rotational positions. A processor is configured to produce a first resistivity image of the formation at the first depth of investigation using the first measurements, produce a second resistivity image of the earth formation at a second depth of investigation using the second measurements, and record the first image and the second image on a suitable medium. Angles in the first plurality of rotational positions may be the same as angles in the second plurality of rotational positions. The first sensor arrangement may further include two axially oriented receiver antennas on a side of the logging tool and two axially oriented transmitter antennas symmetrically disposed about the two axially oriented receiver antennas. The apparatus may further include an orientation sensor configured to make measurements of an orientation of the logging tool during continued rotation. The processor may be further configured to produce the first resistivity image and the second resistivity image by binning and averaging the first measurements using the measurements of the orientation, and binning and averaging the second measurements using the measurements of the orientation. The apparatus may further include at least one longitudinally oriented slot on an exterior of the logging tool, and the transmitter antenna has and the receiver antennas may be disposed in the at least one slot. The apparatus may further include a nonmetallic shield positioned in the at least one slot between an antenna and a body of the drill collar. The nonmetallic shield may be a ferrite and/or a ferromagnetic material. The logging tool may be part of a bottomhole assembly conveyed on a drilling tubular, and the processor may be further configured to control a directional drilling of the bottomhole assembly based at least in part on the first measurements and a second measurements. The first sensor arrangement and/or the second sensor arrangement may be configured to operate at a plurality of frequencies.

Another embodiment of the disclosure is a method of evaluating an earth formation. The method includes conveying a logging tool into a borehole, using a first sensor arrangement to produce first measurements indicative of the resistivity property of the earth formation at a first plurality of rotational positions, using a second sensor arrangement including two axially oriented receiver antennas on a side of the logging tool and tool axially oriented transmitter antennas symmetrically disposed about the tool axially oriented receiver antennas to produce second measurements indicative of the resistivity property of the earth formation having a depth of investigation greater than a depth of investigation of the first measurements at a second plurality of rotational positions. The method further includes producing a first image of the resistivity property of the earth formation at the first depth of investigation using the first measurements, producing a second image of the resistivity property of the earth formation act the second depth of investigation using the second measurements, and recording the first image and second in age on a suitable medium. The method further includes making measurements of an orientation of the logging tool during continued rotation. The method may further include producing the first image and the second image by binning and averaging the first measurements and second measurements respectively. The method may further include comparing the first image and the second image to provide an indication of borehole damage, invasion and/or a review change in geology. The method may further include positioning the transmitter antennas and the receiver antennas in the at least one longitudinally oriented slot on an exterior of the logging tool. The method may further include positioning a nonmetallic shield in the at least one slot between an antenna and a body of the drill collar. The method may further include positioning the logging tool on a bottomhole assembly conveyed on a drilling tubular and controlling a direction of drilling bottomhole assembly based at least in part on the first measurements and second measurements.

Another embodiment is a computer readable medium for use with an apparatus for evaluating an earth formation. The apparatus includes a logging tool configured to be conveyed into a borehole, a first sensor arrangement on the logging tool configured to produce first measurements indicative of the resistivity property of the earth formation at a first plurality of rotational positions of the logging tool, a second sensor arrangement on the logging tool, second sensor arrangement including two axially oriented receiver antennas on a side of the logging tool and two axially oriented transmitter antennas symmetrically disposed about the two axially oriented receiver antennas, the second sensor arrangement configured to produce second measurements indicative of the resistivity property of the earth formation having a greater depth of investigation than a depth of investigation of the first measurements at a second plurality of rotational positions. The medium includes instructions which enable a processor to produce a first image of the resistivity property of the earth formation at the first depth of investigation using the first measurements, producing a second image of the resistivity property of the earth formation at the second depth of investigation using the second measurements, and record the first image and second image on a suitable medium. The medium may include a ROM, an EPROM, an EAROM, a flash memory, and/or an optical disk.

BRIEF DESCRIPTION OF THE DRAWINGS

The novel features believed characteristic of the disclosure are set forth in the appended claims. The disclosure itself, however, as well as an exemplary mode of use, further objectives and advantages thereof, will best be understood by reference to the following detailed description of an illustrative embodiment when read in conjunction with the accompanying drawings, wherein:

DETAILED DESCRIPTION OF THE DISCLOSURE

Figure 1:
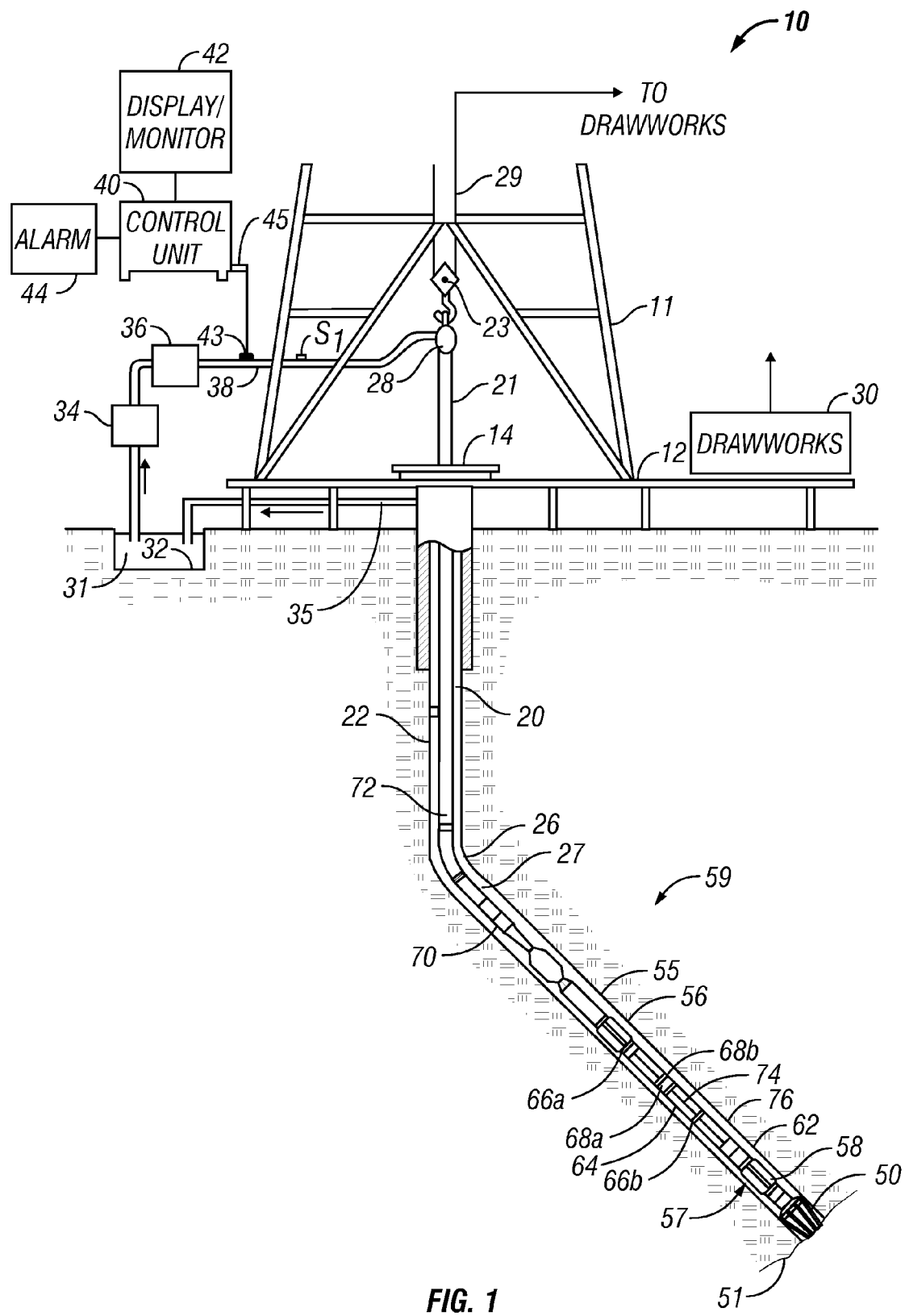
FIG. 1 (Prior Art) describes an overall simultaneous drilling and logging system that incorporates an electromagnetic wave propagation resistivity measurement system according to this disclosure.

FIG. 1 shows a schematic diagram of a drilling system 10 having a downhole assembly containing an acoustic sensor system and the surface devices according to one embodiment of present disclosure. As shown, the system 10 includes a conventional derrick 11 erected on a derrick floor 12 which supports a rotary table 14 that is rotated by a prime mover (not shown) at a desired rotational speed. A drill string 20 that includes a drill pipe section 22 extends downward from the rotary table 14 into a borehole 26. A drill bit 50 attached to the drill string downhole end disintegrates the geological formations when it is rotated. The drill string 20 is coupled to a drawworks 30 via a kelly joint 21, swivel 28 and line 29 through a system of pulleys 27. During the drilling operations, the drawworks 30 is operated to control the weight on bit and the rate of penetration of the drill string 20 into the borehole 26. The operation of the drawworks is well known in the art and is thus not described in detail herein.

During drilling operations a suitable drilling fluid (commonly referred to in the art as "mud") 31 from a mud pit 32 is circulated under pressure through the drill string 20 by a mud pump 34. The drilling fluid 31 passes from the mud pump 34 into the drill string 20 via a desurger 36, fluid line 38 and the kelly joint 21. The drilling fluid is discharged at the borehole bottom 51 through an opening in the drill bit 50. The drilling fluid circulates uphole through the annular space 27 between the drill string 20 and the borehole 26 and is discharged into the mud pit 32 via a return line 35. Preferably, a variety of sensors (not shown) are appropriately deployed on the surface according to known methods in the art to provide information about various drilling-related parameters, such as fluid flow rate, weight on bit, hook load, etc.

A surface control unit 40 receives signals from the downhole sensors and devices via a sensor 43 placed in the fluid line 38 and processes such signals according to programmed instructions provided to the surface control unit. The surface control unit displays desired drilling parameters and other information on a display/monitor 42 which information is utilized by an operator to control the drilling operations. The surface control unit 40 contains a computer, memory for storing data, data recorder and other peripherals. The surface control unit 40 also includes models and processes data according to programmed instructions and responds to user commands entered through a suitable means, such as a keyboard. The control unit 40 is preferably adapted to activate alarms 44 when certain unsafe or undesirable operating conditions occur.

A drill motor or mud motor 55 coupled to the drill bit 50 via a drive shaft (not shown) disposed in a bearing assembly 57 rotates the drill bit 50 when the drilling fluid 31 is passed through the mud motor 55 under pressure. The bearing assembly 57 supports the radial and axial forces of the drill bit, the downthrust of the drill motor and the reactive upward loading from the applied weight on bit. A stabilizer 58 coupled to the bearing assembly 57 acts as a centralizer for the lowermost portion of the mud motor assembly.

In one embodiment of the system of present disclosure, the downhole subassembly 59 (also referred to as the bottomhole assembly or "BHA") which contains the various sensors and MWD devices to provide information about the formation and downhole drilling parameters and the mud motor, is coupled between the drill bit 50 and the drill pipe 22. The downhole assembly 59 preferably is modular in construction, in that the various devices are interconnected sections so that the individual sections may be replaced when desired.

Still referring back to FIG. 1, the BHA may also contain sensors and devices in addition to the above-described sensors. Such devices include a device for measuring the formation resistivity near the drill bit, a gamma ray device for measuring the formation gamma ray intensity and devices for determining the inclination and azimuth of the drill string. The formation resistivity measuring device 64 may be coupled above the lower kick-off subassembly 62 that provides signals, from which resistivity of the formation near or in front of the drill bit 50 is determined. A dual propagation resistivity device ("DPR") having one or more pairs of transmitting antennae 66a and 66b spaced from one or more pairs of receiving antennae 68a and 68b may be used. Magnetic dipoles are employed which operate in the medium frequency and lower high frequency spectrum. In operation, the transmitted electromagnetic waves are perturbed as they propagate through the formation surrounding the resistivity device 64. The receiving antennae 68a and 68b detect the perturbed waves. Formation resistivity is derived from the phase and/or amplitude of the detected signals. The detected signals are processed by a downhole circuit that is preferably placed in a housing 70 above the mud motor 55 and transmitted to the surface control unit 40 using a suitable telemetry system 72. Determination of formation resistivity from amplitude and phase measurements is well known in prior art. U.S. Pat. No. 5,811,973 to Meyer having the same assignee as the present disclosure and the contents of which are fully incorporated herein by reference, further teaches the determination of resistivity of the connate formation fluid, the dielectric constant of the dry rock matrix, and the water filled porosity of the formation. Such determinations may also be made with the present disclosure using the methods taught by Meyer.

The inclinometer 74 and gamma ray device 76 are suitably placed along the resistivity measuring device 64 for respectively determining the inclination of the portion of the drill string near the drill bit 50 and the formation gamma ray intensity. Any suitable inclinometer and gamma ray device, however, may be utilized for the purposes of this disclosure. In addition, an azimuth device (not shown), such as a magnetometer or a gyroscopic device, may be utilized to determine the drill string azimuth. Such devices are known in the art and are, thus, not described in detail herein. In the above-described configuration, the mud motor 55 transfers power to the drill bit 50 via one or more hollow shafts that run through the resistivity measuring device 64. The hollow shaft enables the drilling fluid to pass from the mud motor 55 to the drill bit 50. In an alternate embodiment of the drill string 20, the mud motor 55 may be coupled below resistivity measuring device 64 or at any other suitable place.

The drill string contains a modular sensor assembly, a motor assembly and kick-off subs. In a preferred embodiment, the sensor assembly includes a resistivity device, gamma ray device, and inclinometer. A processor (not shown) is located downhole for processing the data. Due to the large amount of data that are obtained and processed downhole, a memory device having adequate capacity is necessary.

The above-noted devices transmit data to the downhole telemetry system 72, which in turn transmits the received data uphole to the surface control unit 40. The downhole telemetry also receives signals and data from the uphole control unit 40 and transmits such received signals and data to the appropriate downhole devices. The present disclosure preferably utilizes a mud pulse telemetry technique to communicate data from downhole sensors and devices during drilling operations. A transducer 43 placed in the mud supply line 38 detects the mud pulses responsive to the data transmitted by the downhole telemetry 72. Transducer 43 generates electrical signals in response to the mud pressure variations and transmits such signals via a conductor 45 to the surface control unit 40. Other telemetry techniques such electromagnetic and acoustic techniques or any other suitable technique may be utilized for the purposes of this disclosure. The drilling assembly also includes a directional sensor. Without limiting the scope of the disclosure, the directional sensor can be a magnetometer or of the inertial type.

In one embodiment of the disclosure, a drilling sensor module 59 is placed near the drill bit 50. The drilling sensor module contains sensors, circuitry and processing software and algorithms relating to the dynamic drilling parameters. Such parameters preferably include bit bounce, stick-slip of the drilling assembly, backward rotation, torque, shocks, borehole and annulus pressure, acceleration measurements and other measurements of the drill bit condition. A suitable telemetry or communication sub 72 using, for example, two-way telemetry, is also provided as illustrated in the drilling assembly 90. The drilling sensor module processes the sensor information and transmits it to the surface control unit 40 via the telemetry system 72.

Figure 2:
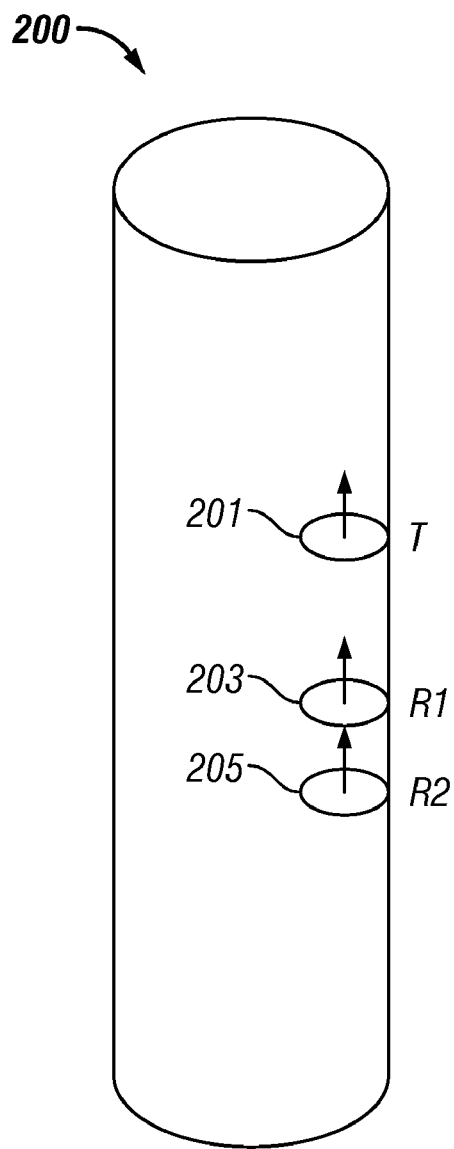
FIG. 2 is a simplified schematic depiction of a possible antenna configuration which may be utilized in accordance with the teachings of the present disclosure.

Turning no to FIG. 2, the basic hardware configuration of the present disclosure is illustrated. The logging tool 200 is provided with a transmitter antenna 201 having an axis parallel to the longitudinal axis of the tool. Two receiver antennas 203, 205 also have their axes parallel to the longitudinal axis of the tool. In this regard, the configuration of the transmitter and receiver antennas is similar to that of the basic propagation resistivity tool. The difference lies in the fact that in the presence device, the antennas do not circle the longitudinal axis of the tool. Instead, they are positioned, vertically aligned, on one side of the tool. The detailed configuration of the coils is discussed below with reference to FIG. 7.

Upon activation of the transmitter antenna 201, an electromagnetic wave is propagated in the formation. Measurements are made with the two receivers 203, 205. A processor determines the phase shift between the signals at the two receiver antennas and/or the relative attenuation of the signals at the two antennas. These measurements are indicative of the formation resistivity, as in prior art MPR devices. The difference lies in the fact that due to the limited aperture of the antennas, the measurements made are indicative of the formation resistivity in a limited range of azimuths. Concurrently with the resistivity measurements, a toolface measurement device makes measurements of the toolface angle. The toolface measurement device may be a magnetometer, an accelerometer, and/or a gyroscope. Typically, measurements made within an azimuthal bin of size 15° are averaged, recorded and subsequently displayed by the processor. The frequency of operation of the transmitter is selected so as to provide, typically, a minimum phase shift of 1° between the receivers and/or a minimum relative attenuation of 0.1 dB. The apparatus may also be configured to operate at multiple frequencies.

Figure 3:
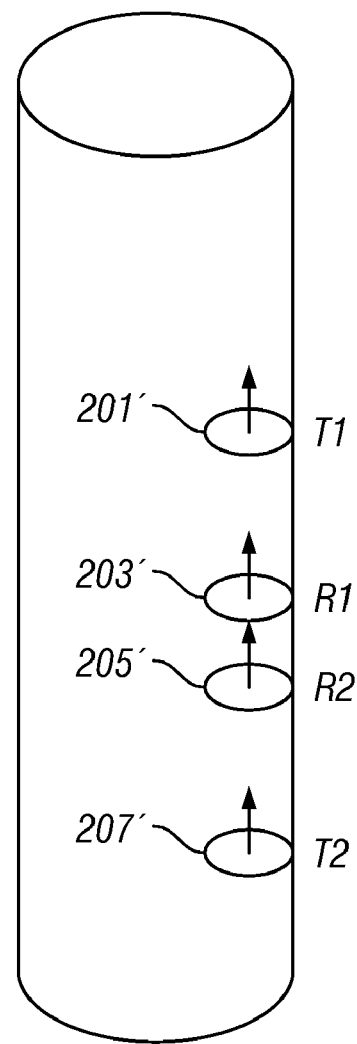
FIG. 3 illustrates an antenna configuration used to obtain compensated resistivity measurements.

In another embodiment of the disclosure, an additional transmitter 207' symmetrically disposed about the receivers 203', 205' relative to the first transmitter 201', as shown in FIG. 3, is used. With this arrangement, attenuation and/or phase shift are determined for each transmitter, and the average of the attenuation and/or phase shift from both transmitters provides compensated resistivity measurements.

Another embodiment of the disclosure uses four transmitters and two receivers 405, 407. The signals from the near transmitters 403, 409 provide compensated measurements with a depth of investigation (shallow). The signals from the far transmitters 401, 411 provide compensated measurements with a greater depth of investigation. These referred to as the deep measurements.

In practice, the deep resistivity imager and shallow resistivity imager may be on the same sub or on different subs. The deep azimuthal resistivity measurements and shallow resistivity measurements are taken at multiple toolface angles and may be binned as described above. Resistivity images may be produced separately from the two devices. The deep images allows for well planning. The shallow image is indicative of phenomenon such as a borehole damage and mud invasion. The differences between the two images may be indicative of radial changes in geology. The shallow image can also serve as a constraint on the deep image.

It should be noted that the measurements made by the shallow resistivity imager need not be made at the same rotational angles as the measurements made by the deep resistivity imager. This could happen, for example, if the shallow imager and the deep imager are on different subs with different clocks. What is important is that after binning and averaging, averaged measurements are obtained over the same azimuthal bins. The shallow resistivity imager and the deep resistivity imager may be referred to as "the first sensor arrangement" and the "second sensor arrangement" respectively.

It should be noted that the use of a MPR type device for shallow imaging is not to be construed as a limitation. The shallow image may also be obtained by using a galvanic device. An exemplary wireline device for obtaining azimuthally sensitive resistivity measurements is discussed, for example, in U.S. Pat. No. 7,109,719 to Fabris et al. having the same assignee as the present disclosure and the contents of which are incorporated herein by reference.

Figures 4, 5:
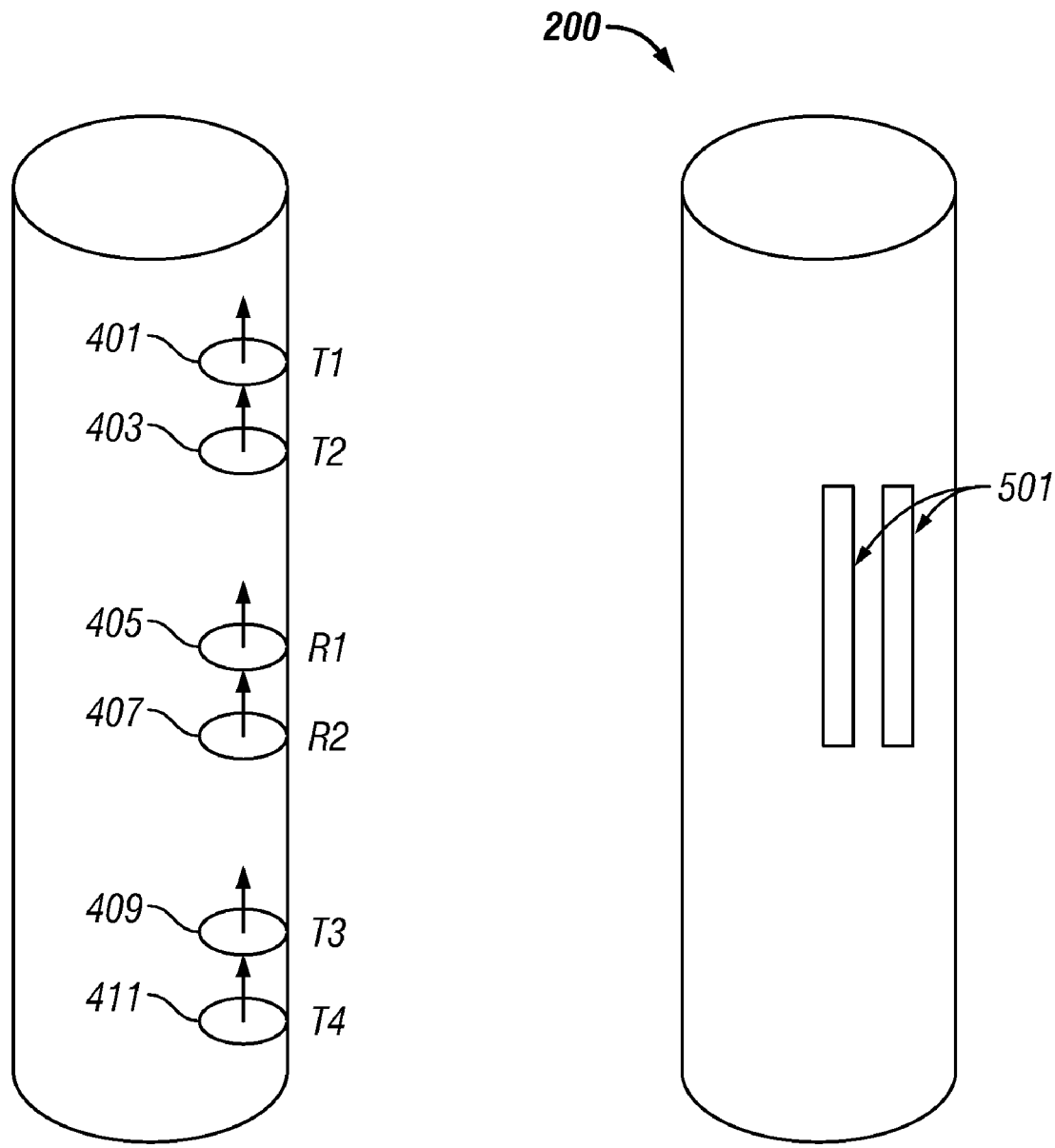
FIG. 4 shows an antenna arrangement with multiple depths of investigation.
FIG. 5 shows a slotted drill collar.
Figure 6:
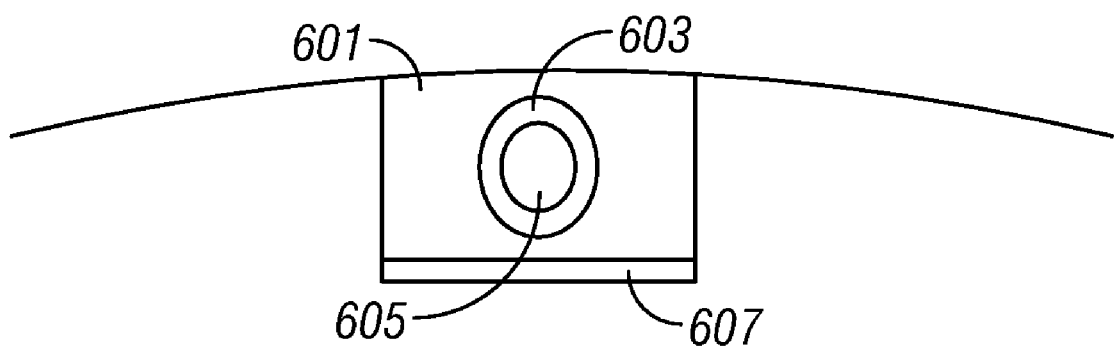
FIG. 6 shows the antenna arrangement inside a slot.
Figure 6:
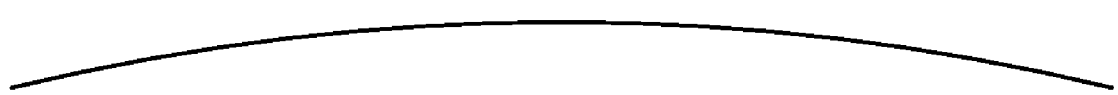

Turning now to FIG. 5, a slotted drill collar with one or more slots 501 is shown. As seen in FIG. 6, the antenna coil 603 is positioned inside the slot 601. A nonmetallic shield 607 such as ferrite or a ferromagnetic material is disposed between an antenna coil and the body of the drill collar 200. With such a configuration, the electromagnetic field generated by the transmitter has a limited azimuthal coverage. With proper selection of the coil size and design of the slot, a radiation pattern of about 15° can be obtained. As indicated in FIG. 5, more than one slot may be used.

The processing of the data may be done by a downhole processor to give corrected measurements substantially in real time. Alternatively, the measurements could be recorded downhole, retrieved when the drillstring is tripped, and processed using a surface processor. Implicit in the control and processing of the data is the use of a computer program on a suitable machine readable medium that enables the processor to perform the control and processing. The machine readable medium may include ROMs, EPROMs, EEPROMs, Flash Memories and Optical disks.

What is claimed is:

1. An apparatus for evaluating an earth formation, the apparatus comprising:
   (a) a logging tool configured to be conveyed into a borehole;
   (b) a first sensor arrangement on the logging tool configured to produce first measurements responsive to a propagating electromagnetic wave indicative of a resistivity property of the earth formation at a first plurality of rotational positions of the logging tool during continued rotation of the tool;
   (c) a second sensor arrangement on the logging tool, the second sensor arrangement including two axially oriented receiver antennas having axes on a single side of a longitudinal axis of the logging tool and two axially oriented transmitter antennas symmetrically disposed about the two axially oriented receiver antennas, the second sensor arrangement configured to produce second measurements responsive to a propagating electromagnetic wave indicative of the resistivity property of the earth formation having a depth of investigation greater than a depth of investigation than that of the first measurements at a second plurality of rotational positions;
   (d) a processor configured to:
      (A) produce a first image of the resistivity property of the earth formation at the first depth of investigation using the first measurements,
      (B) produce a second image of the resistivity property of the earth formation at the second depth of investigation using the second measurements, and
      (C) record the first image and the second image on a suitable medium.

2. The apparatus of claim 1 wherein angles in the first plurality of rotational positions are the same as angles in the second plurality of rotational positions.

3. The apparatus of claim 1 further comprising an orientation sensor configured to make measurements of an orientation of the logging tool during continued rotation.

4. The apparatus of claim 3 wherein the processor is further configured to produce the first image and the second image by further:
   (i) binning and averaging the first measurements using the measurements of the orientation, and
   (ii) binning and averaging the second measurements using the measurements of the orientation.

5. The apparatus of claim 1 wherein the processor is further configured to compare the first and second images to provide an indication of at least one of: (i) borehole damage, (ii) invasion, and (iii) a radial change in geology.

6. The apparatus of claim 1 further comprising at least one longitudinally oriented slot on an exterior of the logging tool, and wherein the transmitter antennas and the receiver antennas are disposed in the at least one slot.

7. The apparatus of claim 6 further comprising a nonmetallic shield positioned in the at least one slot between an antenna and a body of the drill collar.

8. The apparatus of claim 7 wherein the nonmetallic shield further comprises at least one of: (i) a ferrite, and (ii) a ferromagnetic material.

9. The apparatus of claim 1 wherein the logging tool is part of a bottomhole assembly conveyed on a drilling tubular, and wherein the processor is further configured to control a direction of drilling of the bottomhole assembly based at least in part on: (i) the first measurements, and (ii) the second measurements.

10. The apparatus of claim 1 wherein at least one of the first sensor arrangement and the second sensor arrangement is further configured to operate at a plurality of frequencies.

11. The apparatus of claim 1, wherein the two axially oriented receiver antennas are responsive to a current induced in the formation by at least one of the two axially oriented transmitter antennas.

12. A method of evaluating an earth formation, the method comprising:
conveying a logging tool into a borehole;
using a first sensor arrangement to produce a propagating electromagnetic wave in the formation and make first measurements indicative of a resistivity property of the earth formation at a first plurality of rotational positions of the logging tool during continued rotation of the tool;
using a second sensor arrangement including two axially oriented receiver antennas having axes on a single side of a longitudinal axis of the logging tool and two axially oriented transmitter antennas symmetrically disposed about the two axially oriented receiver antennas to produce a propagating electromagnetic wave in the formation and make second measurements indicative of the resistivity property of the earth formation having a depth of investigation greater than a depth of investigation of the first measurements at a second plurality of rotational positions;
producing a first image of the resistivity property of the earth formation at the first depth of investigation using the first measurements,
producing a second image of the resistivity property of the earth formation at the second depth of investigation using the second measurements, and
recording the first image and the second image on a suitable medium.

13. The method of claim 12 further comprising making the first measurements at the same rotational angles as the second measurements.

14. The method of claim 12 further comprising making measurements of an orientation of the logging tool during continued rotation.

15. The method of claim 12 further comprising producing the first image and the second image by further:
(i) binning and averaging the first measurements using the orientation measurements, and
(ii) binning and averaging the second measurements using the orientation measurements.

16. The method of claim 12 further comprising comparing the first and second images to provide an indication of at least one of: (i) borehole damage, (ii) invasion, and (iii) a radial change in geology.

17. The method of claim 12 further comprising positioning the transmitter antennas and the receiver antennas in at least one longitudinally oriented slot on an exterior of the logging tool.

18. The method of claim 17 further comprising positioning a nonmetallic shield in the at least one slot between an antenna and a body of the drill collar.

19. The method of claim 12 further comprising:
(i) positioning the logging tool on a bottomhole assembly conveyed on a drilling tubular, and
(ii) controlling a direction of drilling of the bottomhole assembly based at least in part on: (I) the first measurements, and (II) the second measurements.

20. A computer-readable medium product having stored thereon instructions that when read by a processor cause the processor to perform a method, the method comprising:
producing a first image of a resistivity property of an earth formation at a first depth of investigation using first measurements based on a propagating electromagnetic wave in the formation made by a first sensor arrangement on a logging tool at a first plurality of rotational positions of the logging tool,
producing a second image of the resistivity property of the earth formation at a second depth of investigation using second measurements based on a propagating electromagnetic wave in the formation made by a second sensor arrangement on the logging tool, the second sensor arrangement including two axially oriented receiver antennas having axes on a single side of a longitudinal axis of the logging tool and two axially oriented transmitter antennas symmetrically disposed about the two axially oriented receiver antenna, the second depth of investigation being greater than the first depth of investigation, and
recording the first image and the second image on a suitable medium.

21. The medium of claim 20 further comprising at least one of (i) a ROM, (ii) an EPROM, (iii) an EAROM, (iv) a flash memory, and (v) an optical disk.

* * * * *